UNITED STATES PATENT OFFICE.

CLARENCE DELAFIELD, OF STATEN ISLAND, NEW YORK.

IMPROVEMENT IN THE MANUFACTURE OF WHITE LEAD.

Specification forming part of Letters Patent No. 52,144, dated January 23, 1866.

*To all whom it may concern:*

Be it known that I, CLARENCE DELAFIELD, of Staten Island, in the county of Richmond and State of New York, have invented certain new and useful Improvements in the Art of Manufacturing White Lead; and I do hereby declare the following to be a full, clear, and exact description of the same.

The method now employed to manufacture white lead is, briefly stated, as follows: Earthen pots are first partially filled with vinegar. Pieces of sheet-lead are then suspended in the pots over the vinegar. The pots are then set in beds of tan-bark, which generates sufficient heat to drive off the acetic acid, thus producing oxidization of the lead, forming oxide of lead. This takes up carbonic acid from the atmosphere, forming carbonate of lead, which has afterward to be washed, dried, and ground, requiring altogether from three to four months to produce the white lead of commerce. The chief objection to this process is the time required to turn the pure lead into the carbonate of lead, which objection I avoid by adopting the following method: First, take fifty-four parts of nitric acid, or its equivalent for this purpose, and one hundred and four parts of lead, or its equivalent for this purpose, and unite them in about seven times their weight of water, or its equivalent for this purpose; then take about eighty-five parts of the carbonate of potash, or its equivalent for this purpose, and unite it with about five times its weight of water, or its equivalent for this purpose; then mix the nitrate of lead and water thus formed with the carbonate of potash and water, and the result will be carbonate of lead or white lead and nitrate of potash or saltpeter, the whole of the chemical constituents being at once resolved into these two articles of commerce, the white lead without the delay of a single day, and the saltpeter as soon as the nitrate of potash can be crystallized.

In the above-described method carbonate of soda may be substituted for carbonate of potash, and the proportions of some of the constituents may be varied a little; but the above proportion will give good results.

It will be seen that in manufacturing white lead after this process saltpeter results as a valuable commercial residue of the carbonate of lead, which is instantly formed by this process.

Having now described my improvement in the art of manufacturing white lead, I claim and desire to secure by Letters Patent—

1. Manufacturing white lead by the use of the above-described chemicals, or their equivalents for this purpose, so combined, applied, or united as to yield saltpeter as a residue of the process.

2. The use of the above-described chemicals, or their equivalents for this purpose, when so combined, united, or applied as to produce the white lead of commerce.

3. Manufacturing the white lead of commerce by substituting the above-described process.

CLARENCE DELAFIELD.

Witnesses:
AMOS BROADNAX,
PETER D. KENNEY.